United States Patent [19]

Bodenheimer et al.

[11] Patent Number: 4,516,018

[45] Date of Patent: May 7, 1985

[54] SOLAR SENSING ARRANGEMENT FOR USE IN A UNIAXIS SOLAR COLLECTOR TRACKING SYSTEM

[75] Inventors: Joseph S. Bodenheimer; Naphtali Eisenberg, both of Jerusalem, Israel

[73] Assignee: Luz International Ltd., Los Angeles, Calif.

[21] Appl. No.: 328,183

[22] Filed: Dec. 7, 1981

[30] Foreign Application Priority Data

Sep. 4, 1981 [IL] Israel ............................................. 63740

[51] Int. Cl.$^3$ .............................................. G01J 1/20
[52] U.S. Cl. ................................... 250/203 R; 350/434; 126/425
[58] Field of Search ........................... 126/424, 425; 250/203 R; 350/433, 434; 353/3; 356/141, 152

[56] References Cited

U.S. PATENT DOCUMENTS 3,581,099  5/1971  Franke .................................. 350/434
4,367,403  1/1983  Miller .................................. 250/203 R

FOREIGN PATENT DOCUMENTS 56-138705 10/1981 Japan .................................. 350/433

Primary Examiner—David C. Nelms
Assistant Examiner—Jere J. Brophy
Attorney, Agent, or Firm—Browdy and Neimark

[57] ABSTRACT

A sensor for use in aligning a solar collector system wherein the sensor includes a radiation detector providing signals responsive to impinging radiation and means for focusing the radiation into an astigmatic image positioned on the detector when the system is misaligned.

10 Claims, 6 Drawing Figures

SOLAR SENSING ARRANGEMENT FOR USE IN A UNIAXIS SOLAR COLLECTOR TRACKING SYSTEM

FIELD OF THE INVENTION

This invention is concerned with solar collectors and more particularly with sensing devices used in tracking systems for solar collectors.

BACKGROUND OF THE INVENTION

Solar energy collectors have been used for centuries. Non-imaging solar collectors can be stationary, usually set up facing in a southerly direction in the northern hemisphere to enable absorbing a maximum amount of impinging solar radiation. Imaging solar collectors which track the sun also have a long history. The tracking solar collectors may be classified into two main types: one type includes spherical concentrators having energy absorbing means at the focal point. Either the concentrators or the absorber is controlled to follow the sun by moving on two axes; the other type includes cylindrical concentrators such as trough-like parabolically shaped reflecting collectors which move on one axis to track the sun.

The trough-like parabolic collectors may be mounted in an east-west orientation, that is with its longitudinal axis in the east-west direction and set originally at an angle to the horizontal so that the plane of the open side of the parabola is perpendicular to the sun's rays most of the day. The daily tracking rotation movement accounts for the differences in the azimuth angle of the sun during the year.

The longitudinal axis of the trough-like collector may also be set in a north-south direction wherein the collector rotates on its longitudinal axis through the day to follow the sun as it rises in the east, goes through its zenith and sets in the west.

There are three methods of controlling solar tracking systems in present use. There is a tracking system that uses a sensor to maintain the collector in its desired heliotropic position. There is a tracking system that is controlled by a computer program which takes into account the variations of the sun's position throughout the day and the year. There is also a hybrid system which uses the computer programming system to generally orient the collectors and uses a sensor system for the verniar corrections.

In both the sensor controlled system and the hybrid system the sensor apparatus is the heart of the system. The sensor apparatus in the past has been a critical part of the solar tracking system. Two major sensor devices used in the prior art are optical sensors and flux integration sensors.

The optical sensors generally utilize optical detectors connected in bridge circuitry which provides control signals when there is a lack of balance caused by disorientation of the reflector. Thus where the reflector is not properly positioned the off-center shift generates an error signal. The error signal causes a servo-system to reorient the reflector to correct the error in position.

The most common type of optical sensor in use is the shadow band sensor. In this sensor a partition between detector means is used to cast a shadow on the detectors or arrays of detectors. When the collector is not properly positioned, the shadowed areas are unequal, the circuit is unbalanced and a signal is generated for correcting the error. Precise mechanical alignment of the sensor relative to the reflector is required. In addition the tracking position can be upset by the effects of clouds, for example, or an insect walking across the sensor and causing a shadow on the detector.

Other optical detectors are flux line detectors which are placed on both sides of the focal point or line of the concentrator. The advantage of flux line detectors is the optical gain due to the concentration. However flux line detectors are affected by local perturbations in the concentrator surface.

Other disadvantages of optical sensors are unequal aging of the detetectors, changes in the electronic bias of the detectors, dirt on the photo-cells of the detectors or cover plate and mis-alignment between the sensor and optimum reflector position.

The flux integration sensors are typified by the resistance wire sensors wherein, a fine resistance wire is wrapped in a spiral around the absorber. Heat flux variations caused by solar radiation are sensed by changes in the electrical resistance of the wire. The collector is driven to follow the maximum resistance (most heat).

These sensors are difficult to service or replace because of access problems. The controls are complicated by the necessity of driving the reflector through a range of angles to determine the position of maximum resistance. There is also a basic insensitivity to reflector angular position.

SUMMARY OF THE INVENTION

Accordingly it is an object of the present invention to provide new and improved solar sensors for collector tracking systems in which the above-referred to problems and disadvantages are substantially reduced or overcome.

According to the present invention a sensor for use in solar collector tracking systems is provided to aid in collecting solar radiation, said system comprising:

a shaped concentrator, energy absorber means focally positioned with respect to said concentrator, means for aligning said collector system to track the sun responsive to alignment signals, sensor means for determining when the system must be aligned to track the sun, said sensor means comprising radiation detector means for providing a signal responsive to impinging radiation, and said sensor means also comprising focusing means for focusing the radiation into an astigmatic image positioned on said detector means when said collector system is misaligned to provide alignment signals.

A further feature of the invention comprises a unique characterized lens shaped like a lens curved into a semi-toroidal shape. A further embodiment of the invention features a shaped cylindrical lens having a substantially semi-circular disc-like cross-section along its longitudinal axis, and an arc-topped rectangular cross-section in the plane normal to its longitudinal axis.

Yet another feature of the invention is the small internal light source used to test and balance the detectors at pre-operative intervals.

BRIEF DESCRIPTION OF THE DRAWINGS

The operation and utilization of the present invention will be more fully apparent from the description of a preferred embodiment taken in conjunction with the following drawings, in which.

GENERAL DESCRIPTION

In a preferred embodiment the inventive system comprises unique shaped toroidal cylindrical lens. However any means such as toroidal mirrors, segments of cylindrical lenses joined together or cylindrical lenses for providing an oblong focused image, i.e. a straight line, can be used within the scope of the invention. The uniquely shaped lens shown and described herein has among other features and advantages a large acquisition angle so that the system is effective when the reflector is oriented in an east-west direction as well as a north-south direction or any direction therebetween. The lens could conceivably be used with other solar radiation collector devices in addition to the trough-like parabolic reflector shown in FIG. 1. However the preferred embodiment uses the unique lens with the trough-like parabolic reflector wherein tracking is accomplished by rotation about a single axis.

Figure 1:
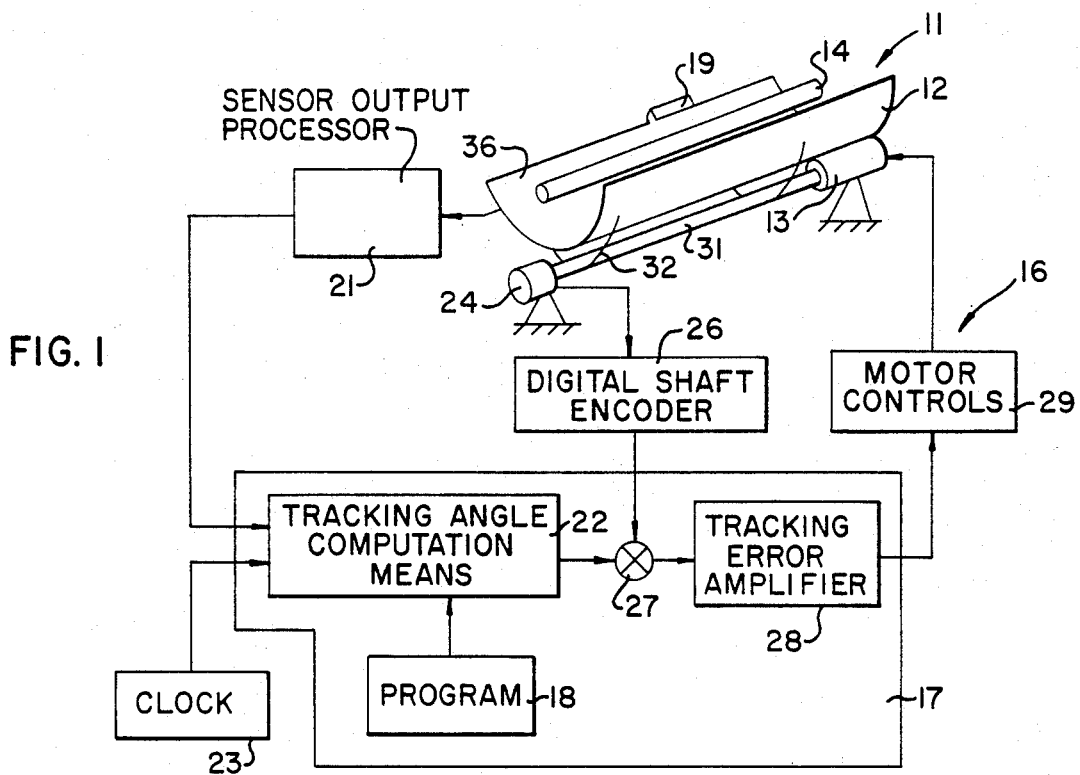
FIG. 1 is a block diagram and schematic pictorial showing of a typical solar collector tracking system using a trough-like parabolic reflector.

Turning now to the drawings, FIG. 1 shows a solar collector system 11 using a shaped solar radiation focusing reflector such as a trough-like parabolic reflector 12 having one axis of rotation. The axis of rotation is parallel to the focal axis of the trough-like parabolic reflector. The rotation of the reflector is caused by motor means such as motor 13 coupled in any well known manner to rotate the parabolic reflector. At the focal axis of the parabolic reflector is an energy absorber shown as cylinder 14. As is well known the reflector focuses the radiant energy onto the energy absorber to maximize the energy convertion, i.e. radiant energy to heat or electricity.

Means are provided for causing the trough-like parabolic reflector 12 to track the source of radiant energy, i.e. the sun. Tracing and tracking control means are generally shown at 16 as using a microprocessor 17. The microprocessor is shown as including a program 18 which provides tracking instructions to the motor 13.

The system is a hybrid system and includes a sensor apparatus 19 mounted external to the reflector for correcting the program 18 to assure fully responsive and correct tracking of the sun. The signal from the sensor 19 is processed by a sensor output processor 21 before being fed into the microprocessor controller 17 and more particularly into a tracking angle computation means 22 in the microprocessor controller.

Inputs into the tracking angle computation means 22 include a clock 23 which tells the computer the time, the day, the month, the year so that the computer has complete seasonal and timing information at all times.

The figure shows a position indicating device such as digital output position detector 24 which sends signals to the digital shaft encoder 26. The actual position is compared to the programmer computed position by comparator circuitry 27. Differences between the actual position and the set position provides a signal to the tracking error amplifier block 28. The tracking error amplifier 28 provides an output signal to motor controls indicated at block 29 which then sends its signal to the motor causing it to position the shaped reflector to a desired position. The system can attempt to constantly hold the concentrator at a position giving o error signal. Alternatively the system can have an acceptable ± error signal, a small error signal that the sensor output versus line is substantially a saw tooth waveform.

The position detector 24 is shown coupled to the motor through shaft 31. The parabolic reflector is fixedly coupled to the shaft 31 with bracket means such as bracket 32.

Figure 2:
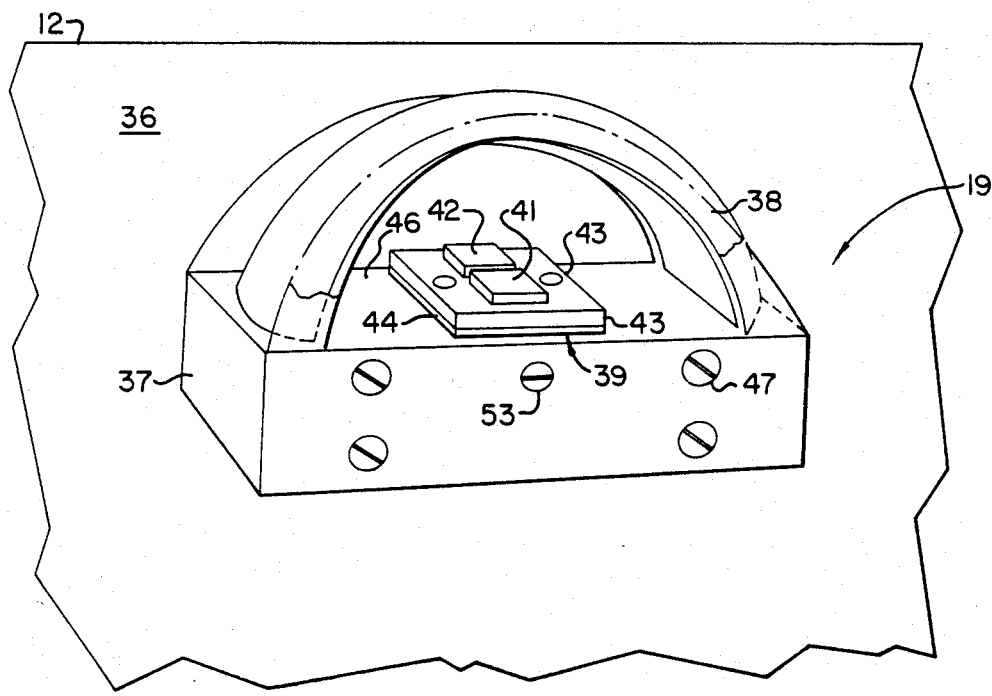
FIG. 2 is a more detailed showing of a portion of the trough with sensor apparatus mounted thereon.

In FIG. 2, the sensor means 19 is shown attached to the outside 36 of the parabolic relfector 12. It is seen that the sensor means comprises a base unit 37 for the mounting and focusing means and the detector means to the outside 36. The focusing means is shown as a unique lens 38. The detector means are shown generally as 39. The detector means comprises a pair of detectors, in this case shown as detectors 41 and 42 mounted with one of the sides of each juxtaposed one to the other. The detector 41 and 42 are mounted on a heat sink device 43 which in a preferred embodiment is a copper block. The block 43 is mounted on top of a shim 44 which in turn is mounted to the surface 46 of the base unit 37. The surface 46 is removed from the lens by a distance that is substantially the focal length of the lens. Base unit 37 includes means, such as fastener 47, for mounting the sensor system to the side 36 of the reflector 12. It should be noted that while the copper block 43 is shown as any well known heat sink means can be used.

The shim 44 is shown to indicate that different shims may be used or the shim may be removed to vary the elevation of the detectors in order to place it into the focal plane or out of the focal plane as desired.

Means are also provided for moving the detectors towards or away from the side 36. This means is shown as the position adjusting screw 53. Just as screw means are used for adjusting the lateral position of the detectors, the elevational position of the detector can also be screw adjusted within the scope of the invention. It should be apparent that the detectors have to be in a plane perpendicular to the plane along which the longitudinal axis of the lens 38 lies. Thus, any known means may be used to so adjust the position of the detectors.

Figures 3, 6:
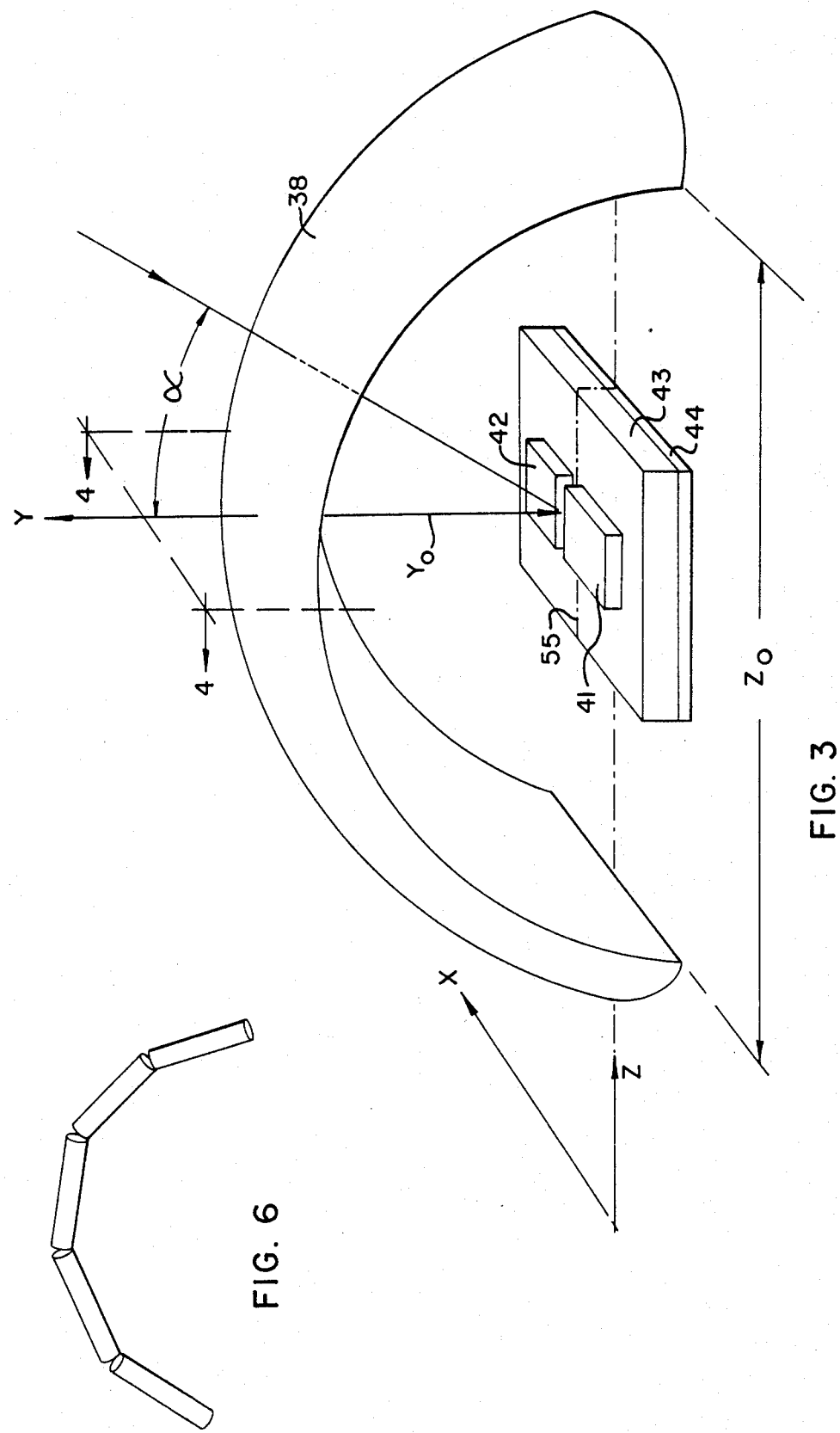
FIG. 3 is a pictorial schematic showing of the unique toroidally-shaped cylindrical lens and sensor system.

FIG. 3 schematically shows the focusing means and detector means of the sensor system 19. The focusing means is again shown shaped like a cylindrical lens curved into a semi-toroidal shape. The detector means 41 and 42 are shown a distance $Y_o$ from the lens. The distance $Y_o$ is approximately equal to the focal length of the lens.

Figure 4:
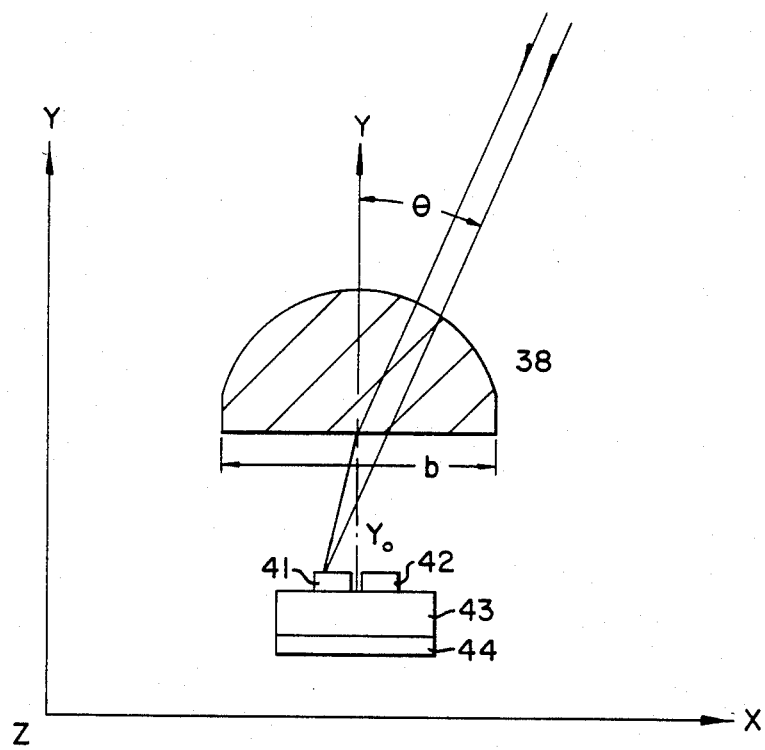
FIG. 4 is a section through the sensor system of FIG. 3 taken on the plane XX and looking in the direction of the arrow.

In FIGS. 3 and 4 three orthogonal axes are shown. Y axis is shown which is a height axis, a Z axis is shown which is perpendicular to the Y axis and defined along the length of the lens and is parallel to the longitudinal axis of the reflector. Also shown is an X axis along the width of the lens image.

The image is oblong having length $Z_o$ and width $X_o$. The width $X_o$ at its center is determined at the focal plane by the angular width of the sun which is $\theta_s$ (shown in FIG. 4) multiplied by the height $Y_o$. Thus $X_o = Y_o \theta_s$. The angle $\theta_s$ is approximately 10 mili-radians. Thus for a lens of a focal length of 80 mm the image width at the focal plane will be 0.8 mm.

The lens width, i.e. b, determines the concentration ratio. The concentration ratio is $G_o$ and is equal to $b/X_o$.

However, the gain G is the ratio between the lens width and the detector width. Thus for a lens of 30 mm width and a detector of 5 mm width, the gain is equal to 6. An angular shift $\theta$ shown in FIG. 4, from the perpendicular corresponds to an image position shift $d = \theta \cdot Y_o$.

Along the X axis, the acquisition range is approximately: tang $\theta = (W \pm X_o)/h$. In the example tang $\theta = 0.73$ or an acquisition angle of 8.3°.

As the angle $\alpha$ increases a waist develops at the center of the image, while the ends of the image become broader because the focal plane is not parallel to the plane of the detectors. The focusing or near focusing of the radiation on the detectors provides an amplification effect which among other things increases the signal to noise ratio of the system and therefore increases the reliablity of the system.

Figure 5:
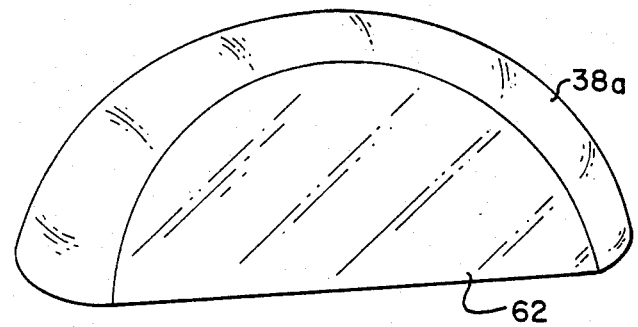
FIG. 5 is a showing of another embodiment of the unique lens shown in FIG. 3.

FIG. 5 shows another preferred embodiment of the inventive toroidal lens. Note that in FIG. 5 the lens 38a instead of being a true toroid, is a semi-cylindrical arrangement, that is the previously hollow portion of the lens is now solid lens material at 62. This arrangement among other things, makes it easier to mount the lens; thereby requiring a much less sophisticated base means than that shown in FIG. 2.

In use then, the detector and the sensing system is attached to the side of the parabolic reflector so that the image is parallel to the rotational axis of the reflector. It should be noted that while only two detectors are shown, a pattern of detectors can easily be used in place of the two detectors.

The system provides for an extremely reliable solar-sensing device for use in solar tracking systems of the type described herein.

While the principles of the invention are described above in connection with specific apparatus and applications, it is to be understood that this description is made by way of example only and not as a limitation on the scope of the invention.

What is claimed is:

1. A solar collector system comprising:
   a shaped concentrator means,
   energy absorption means focally positioned with respect to said concentrator,
   means for realigning said system to track the sun,
   sensor means determining when the system must be realigned,
   said sensor means comprising radiation detector means for providing a signal responsive to impinging radiation, and
   said sensor means also comprising focusing means for focusing the radiation into an astigmatic image positioned on said detector means to generate said alignment signals.

2. The system of claim 1, wherein said means for realigning said system comprises means for rotating said shaped concentrator means about an axis of rotation, and wherein said focusing means provides an acquisition angle of up to 180° measured along the axis of rotation.

3. The system of claim 2, wherein said focusing means is mounted so that said astigmatic image is elongated parallel to the axis of rotation of said concentrator means.

4. The system of claim 1, wherein said focusing means comprises lens means.

5. The system of claim 4, wherein said lens means comprises cylindrical lens segments.

6. The system of claim 4, wherein said lens is shaped as a cylindrical lens curved to form a toroidal shape.

7. The system of claim 4, wherein said lens has a substantially semi-circular cross-section along the longitudinal axis thereof and an arc topped rectangular cross-section in the plane normal to the longitudinal axis.

8. A lens which can be used in the focusing means of claim 1, wherein said lens is shaped as a cylindrical lens, curved to form a toroidal shape.

9. A lens which can be used in the focusing means of claim 1, wherein said lens is a cylindrical lens having a toroidal shape and being solid in cross-section.

10. A sensor which can be used in the system of claim 1, said sensor comprising detector means for providing an output signal responsive to the position of said astigmatic image.

* * * * *